United States Patent [19]

Bold

[11] Patent Number: 4,917,839

[45] Date of Patent: Apr. 17, 1990

[54] METHOD FOR CONTINUOUSLY PRODUCING MOLDED MEMBERS

[75] Inventor: Jörg Bold, Kaiserslautern, Fed. Rep. of Germany

[73] Assignee: "Wurtex" Maschinenbau Hofmann GmbH & Co., Uhingen, Fed. Rep. of Germany

[21] Appl. No.: 203,475

[22] Filed: Jun. 6, 1988

[30] Foreign Application Priority Data

Jun. 6, 1987 [DE] Fed. Rep. of Germany ....... 3719128

[51] Int. Cl.[4] ............................................ B29C 43/48

[52] U.S. Cl. .................................... 264/39; 264/118; 264/122; 264/146; 264/313; 425/335

[58] Field of Search .................. 264/39, 109, 37, 313, 264/118, 122, 146; 425/335

[56] References Cited

U.S. PATENT DOCUMENTS 4,216,179 8/1980 Lamberts et al. .................. 425/335

FOREIGN PATENT DOCUMENTS 2308479 12/1976 France ............................... 425/335

*Primary Examiner*—Hubert C. Lorin
*Attorney, Agent, or Firm*—Robert W. Becker & Associates

[57] ABSTRACT

A method for continuously producing molded members. Prior to dispersing the material for the molded members onto the molding belt, the edge zones of the molding belt are covered by protective belts that move along with the molding belt. This prevents the edge zones of the molding belt from getting very dirty.

3 Claims, 2 Drawing Sheets

1
1a
1b
2
2a
2b
3
4
5
5a
5b
6
7
8
8a
8b
8c
9
10
11
12
13
14
15
16
18
20
21
22

METHOD FOR CONTINUOUSLY PRODUCING MOLDED MEMBERS

BACKGROUND OF THE INVENTION

The present invention relates to a method and apparatus for continuously producing molded members, especially sheets, from a mixture of binder and fibrous material.

Pursuant to the method disclosed in applicant's copending U.S. Pat. Application Ser. No. 791,225 filed Oct. 25, 1985, now abandoned, now replaced by a copending continuation-in-part application SN 319,800-Bold filed Mar. 3, 1989 belonging to the assignee of the present invention the mixture of binder (gypsum) and fibrous material are dispersed in layers upon the molding belt accompanied by the addition of water. The successively dispersed layers are continuously fed to a band presser in which the layers disposed on the molding belt are continuously compacted to cure them.

In practice it has been shown that after leaving the band presser, the edge regions of the compacted sheets adhere especially to the molding belt that supports them; when the sheets are lifted or removed from the molding belt, considerable material residue remains in the edge zones of the molding belt. This is probably attributable to the fact that due to the inevitable drop in the pressure applied in the edge regions of the sheets, the adhesion to the molding belt is greater than the cohesion (inner cohesion) of the edge regions of the compacted material of the molded member. This disturbing phenomenon is observed not only during the production of gypsum/fiber sheets, but also, although to a lesser degree, during the production of fiber sheets, chipboards, etc.

Cleaning the dirty molding belt with mechanical and/or chemical means is complicated and expensive, and even then is unsatisfactory. Damages to the sensitive molding belt as a result of the cleaning process cannot be precluded; considerable wear of the molding belt occurs, especially when the latter is subjected to a high pressure cleaning of the extremely dirty edge regions.

It is therefore an object of the present invention to provide a method and apparatus that reduce soiling of the edge regions of the molding belt to a minimum, so that these edge regions can be easily cleaned in a careful manner.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figures 1, 2:
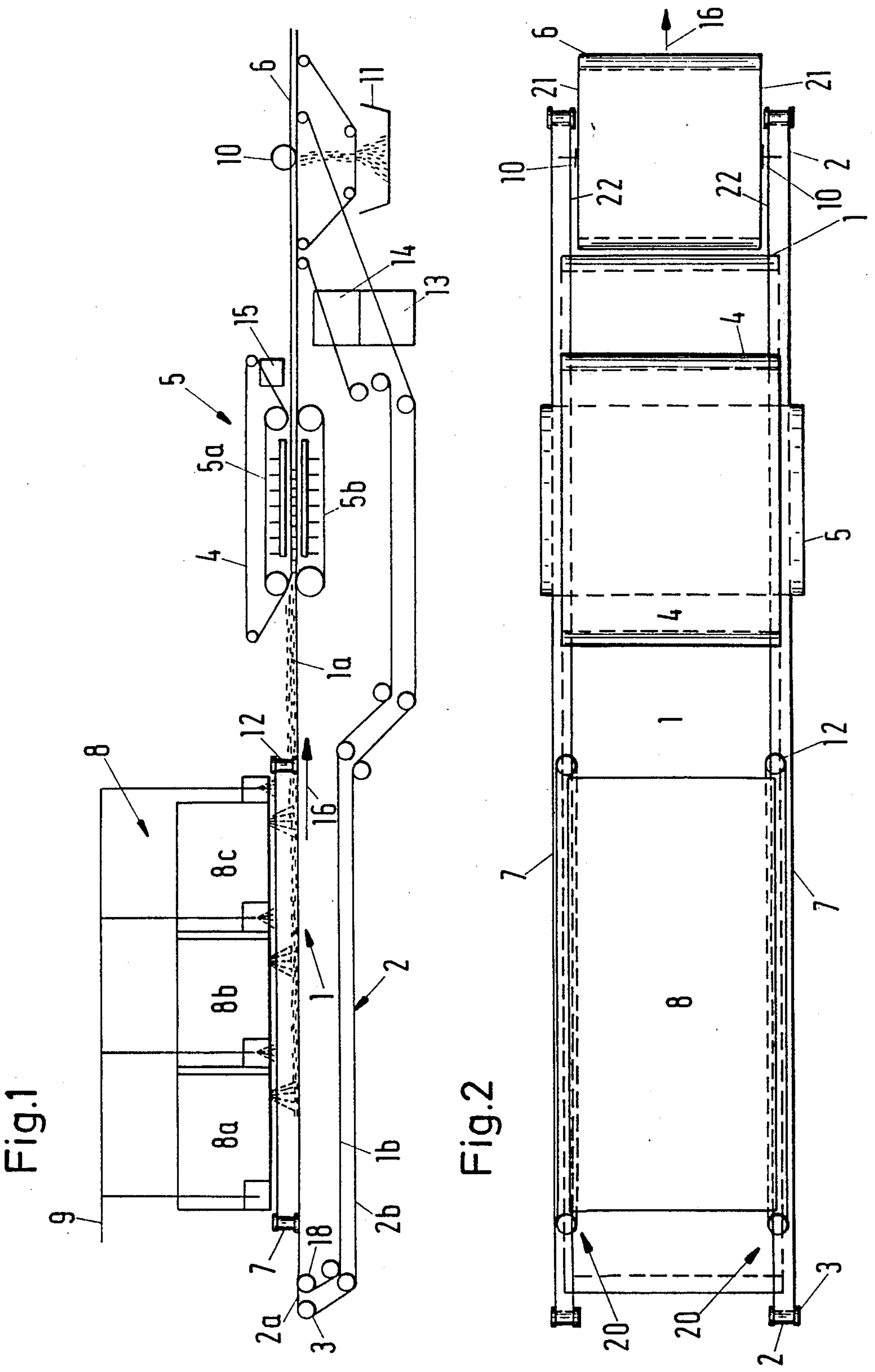
FIG. 1 is a side view of one exemplary embodiment of the inventive apparatus for carrying out the method of the present invention.
FIG. 2 is a plan view of the apparatus of FIG. 1.
Figure 3:
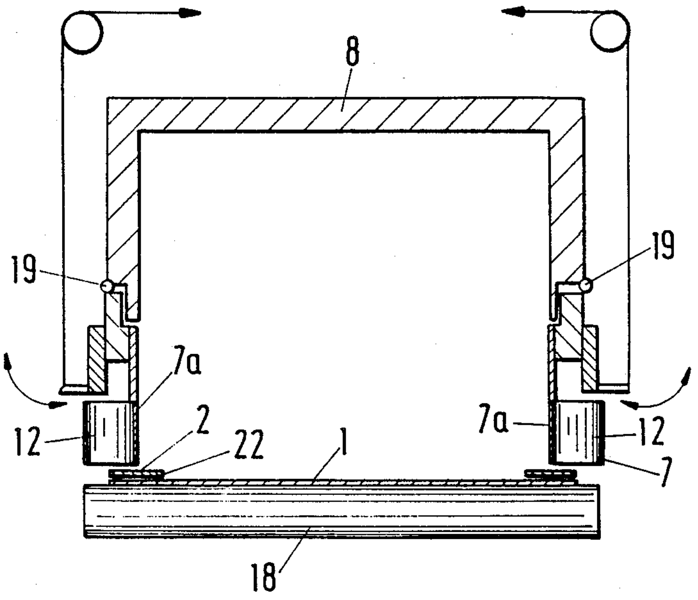
FIG. 3 is a cross-sectional view through essential features of the inventive apparatus at the level of the dispersal head.

The method of the present invention includes the steps of: providing a molding belt that has lateral edges for supporting the edges of the molded member that is to be formed; covering each lateral edge of the molding belt by loosely placing a respective protective belt thereon; then dispersing the binder and fibrous material mixture on the molding belt and protective belts; and then, while the mixture rests on the molding belt and protective belts, compacting the mixture to form the molded member.

The apparatus of the present invention comprises: a support frame; a molding belt that is supported on the frame and has lateral edges for supporting the edges of the molded member that is to be formed: respective first protective belts that are loosely placed on an upper side of the molding belt and overlap the lateral edges thereof, with the protective belts extending approximately parallel to the molding belt; dispersal head means disposed above the molding belt for dispersing the binder and fibrous material mixture on the molding belt; and a pressing mechanism for compacting the mixture on the molding belt and protective belts to form the molded member, whereby the protective belts extend at least from below the dispersal head means to downstream of the pressing mechanism.

As a result of the protective belts on the molding belt, the critical edge zones of the latter cannot become dirty from material that adheres thereto and builds up in these edge zones. It is therefore necessary only to subject the molding belt to a light cleaning, thus keeping wear of the molding belt to a minimum. The power of the washing mechanism that cleans the molding belt can now be reduced since the edges of the molding belt no longer become nearly as dirty as without the protective belts.

If the protective belts rotate along with the molding belt in the direction of travel thereof and at the same speed, relative shiftings between the protective belts and the molding belt are avoided: these relative shiftings could otherwise lead to damage to the material in the edge zones of the molded member.

If the protective belts are removed from the molding belt after the molded member is compacted, are subsequently cleaned, and are again placed upon the molding belt prior to the dispersal head, there is effected a use of the protective belts as endless rotating belts that can be made of a material, preferably synthetic material, that can withstand repeated washings.

Pursuant to one advantageous specific embodiment of the inventive apparatus, the upper run of the protective belts ends downstream of the cutting mechanism, with the inner edge of each protective belt being disposed laterally outwardly next to the trimming edge of the molded member. In this way, the trimmings are carried along by the protective belts, and are preferably discharged into a collector.

Further specific features of the present invention will be described in detail subsequently.

Description of Preferred Embodiments

Referring now to the drawings in detail, the inventive apparatus is particularly suitable for producing gypsum/fiber sheets from a moistened mixture of gypsum and fibrous material. Via the dispersal head 8, which is provided with three individual dispersal heads 8*a*, 8*b*, and 8*c*. each for spreading or dispersing a partial layer, the molded member that is to be formed (in this case a sheet) is spread or dispersed upon the molding belt 1 in three partial layers accompanied by the addition of water over the supply conduit 9. The production of the molded body is described in detail in applicant's aforementioned U.S. Pat. Application 791,225, now abandoned, now replaced by a copending continuation-in-part application SN 319,800-Bold filed Mar. 3 1989 belonging to the assignee of the present invention which is being incorporated into this disclosure by this reference thereto. In the illustrated embodiment, the molding belt 1 is an endless belt of synthetic material with a special sensitive surface. In the direction of travel 16, the upper run 1*a* of the molding belt 1 begins in front of the dispersal head 8 and ends after the pressing mechanism 5 and prior to the saw 10. The molding belt 1 runs in the direction of travel 16 at a constant speed. The return run 1*b* of the molding belt 1 is, following the pressing mechanism 5, guided through a cleaning mechanism 14 to wash residual material from the surface of the molding belt.

The molded member, which is continuously dispersed onto the molding belt 1,is, while it rests upon the upper run 1*a*, continuously compressed or compacted into a sheet in the pressing mechanism 5, for which purpose the latter is provided with an upper and a lower rotating pressing belt 5*a* and 5*b* respectively, each of which is made of steel. The lower pressing belt 5*b* does not itself come into contact with the molded member, but rather rests against the bottom surface of the upper run 1*a* of the molding belt 1. Disposed between the upper pressing belt 5*a* and the molded member that is to be compacted, is a protective belt 4 of synthetic material. In this way, the upper steel pressing belt 5*a* also cannot come into direct contact with the molded member. The protective belt 4 is a rotating belt, the speed and direction of rotation of which correspond to that of the upper pressing belt 5*a*. The return run of the protective belt 4 is guided through a washing mechanism 15.

As can be seen in FIG. 2, each of the pressing belts 5*a* and 5*b* is somewhat wider than the molding belt 1 and the protective belt 4.

At the end of the molding belt 1, the width of which is at least somewhat greater than that of the dispersed or compacted molded body, the compacted molded body is taken over by a rotating sheet-conveying belt 6, the width of which is less than that of the molding belt 1 (see FIG. 2). The compacted molded member therefore extends beyond the edges of the sheet-conveying belt 6, and is trimmed to the desired final width by a cutting mechanism or saw 10 disposed on both sides of the sheet-conveying belt 6. The width of the belt 6 preferably corresponds exactly to the inner distance between the blades of the cutting mechanism 10 disposed on both sides of the sheet-conveying belt 6.

Disposed below the cutting mechanism 10 is a collector 11 for catching the trimmings, which can then be further used.

Pursuant to the present invention, a protective cover belt 2 is disposed above the molding belt 1. The cover belt 2 covers those lateral edges 20 of the molding belt 1 upon which the edges of the molded member rest. The cover belt 2 rotates as an endless belt, and is preferably made of a sturdy, insensitive material. The cover belt 2 rests loosely upon the molding belt 1, and is carried along in the direction of travel 16 of the molding belt 1 at the speed of the latter, so that no relative shifting occurs between the molding belt 1 and the cover belt 2. The cover belt 2 advantageously extends laterally beyond the edges of the upper run 1*a* of the molding belt 1. The cover belt 2 is preferably overlappingly loosely placed upon the upper run 1*a* of the molding belt 1 prior to the dispersal head 8, and is again removed from the molding belt 1 after passing through the pressing mechanism 5. This is effected after the end of the upper run 1*a* of the molding belt 1, in other words, the upper run 2*a* of the cover belt 2 extends beyond the end of the molding belt 1.

The upper run 2*a* of the cover belt 2 expediently ends after the cutting mechanism 10 and above the collector 11. In so doing, the inner edge 22 of the cover belt 2 is spaced from the trimming edge 21 of the cutting mechanism 10, so that the cutting blades can operate without obstruction. As a result of this arrangement, the trimmings that are separated during the cutting operation are guided upon the cover belt 2 to behind the cutting mechanism 10 and, possibly with the aid of mechanical means, are discharged into the collector 11 at the upper run 2*a* of the cover belt 2.

The return run 2*b* of the cover belt 2 is, preferably beyond the range of the collector 11, guided through a washing mechanism 13 in which unwanted material that is still on the cover belt 2 is washed off.

As can be seen from FIGS. 1 and 2, the cover belt 2 is already guided in its support plane prior to the beginning of the upper run 1*a* of the molding belt 1. This is achieved by disposing the guide roller 3 at the beginning of the upper run 1*a* of the cover belt 2 at the level of the guide roller 18 that is disposed at the start of the upper run 1*a* of the molding belt 1. The guide rollers 3 and 18 have the same diameter, and their axes are preferably disposed at exactly the same level.

Rather than embodying the cover belt 2 as an endless rotating belt, it could also be advantageous to embody the cover belt as a throw-away belt that is used only one time. In this case, the throw-away belt is unwound from a supply roll, is supplied ahead of the dispersal head 8 in the aforementioned manner, and can then, for example along with the material that is clinging thereto, be discharged into the collector 11 after leaving the pressing mechanism 5 and the trimmer. The washing mechanism 13 can then be eliminated.

In order to prevent the edge regions of the upper run 1*a* of the molding belt 1 from getting dirty in the region of the dispersal head 8 (the dispersal zone), a lateral cover belt 7 is provided, with the plane of this belt being disposed perpendicular to the plane of the molding belt 1. Such a cover belt 7 is advantageous not only in conjunction with the previously described cover belt 2, but also independently as the only measure for preventing the edge zones of the molding belt 1 from getting dirty or soiled.

The protective belt 7 is preferably a rotating belt, the guide rollers 12 of which are secured to the housing of the dispersal head 8. In this connection, the lower edge of the cover belt 7 is disposed just above the molding belt 1 and the inner edge 22 of the cover belt 2 that rests upon the molding belt 1. The inner run 7*a* of the protective belt 7 rotates in the direction of travel 16 of the molding belt 1, and at the same speed. In order to prevent slippage between the molding belt 1 and the protective belt 7, a positive-engagement gear or chain drive is expediently provided.

The protective belt 7 extends over the entire length of the dispersal head 8, and advantageously extends somewhat beyond the ends of the latter. The height of the cover belt 7 corresponds at least to the height of the molded member that is to be dispersed; preferably, the height of the cover belt 7 is even several times greater than the height of the molded member.

The guide rollers 12 of each protective belt 7, with this preferably applying to the guide rollers 12 on a given side in common, are adapted to be pivoted outwardly about a pivot axis 19 that is disposed in the direction of travel 16 of the molding belt 1, so that the dispersal head 8 is freely accessible for maintenance or other servicing operations.

It has been shown to be expedient to dispose the inner edges 22 of the cover belt 2 preferably 30 to 50 mm from the dispersal range limit determined by the cover belt 7.

The present invention is, of course, in no way restricted to the specific disclosure of the specification and drawings, but also encompasses any modifications within the scope of the appended claims.

What I claim is:

1. A method of continuously producing molded members from a mixture of binder and fibrous material, including the steps of:

providing a molding belt that has lateral edges for supporting the edges of said molded member that is to be formed;

covering each of said lateral edges of said molding belt by loosely placing thereon a horizontal respective cover belt;

then dispersing said binder and fibrous material mixture on said molding belt and its cover belts;

moving said cover belts along with said molding belt in the direction of travel of, and at the same speed as, said molding belt to avoid any relative shifting between the cover belts and the molding belt;

then, while said mixture rests on said molding belt and its cover belts, compacting said mixture to form said molded member; removing said cover belts from said molding belt after said compacting of said molded member, subsequently cleaning said cover belts, and then again placing said cover belts on said molding belt prior to a zone where said dispersing occurs.

2. A method according to claim 1, with which said producing of molded members particularly as sheets, includes trimming edges of the molded members as well as carrying edge trimmings along via the cover belts and discharging the edge trimmings into a collector.

3. A method according to claim 2, which includes reducing of soiling of edge regions of the molding belt to a minimum so that these edge regions can be easily cleaned.

* * * * *